United States Patent [19]
Johnson et al.

[11] 3,864,185
[45] Feb. 4, 1974

[54] METHOD OF MAKING CORRRUGATED PAPERBOARD

[75] Inventors: Paul A. Johnson, West Allis; David Adams, West Bend; Hamilton A. Pinkalla, Milwaukee, all of Wis.

[73] Assignee: I. D., Inc., Cedarburg, Wis.

[22] Filed: July 14, 1972

[21] Appl. No.: 271,969

[52] U.S. Cl.............. 156/208, 117/60, 117/86, 156/210, 156/318, 156/336, 161/133, 161/268, 161/270
[51] Int. Cl.......................................... B31f 1/22
[58] Field of Search .............. 156/205–208, 156/210, 314, 318, 336, 470–473, 292; 106/213; 117/47 R, 84, 86, 37 R, 60; 162/112; 161/133, 268, 270

[56] References Cited
UNITED STATES PATENTS

| | | | |
|---|---|---|---|
| 2,346,644 | 4/1944 | Bauer et al. | 156/318 X |
| 3,434,901 | 3/1969 | Griffiths et al. | 156/470 X |
| 3,536,561 | 10/1970 | Griffiths | 156/210 X |
| 3,690,981 | 9/1972 | Frank et al. | 156/210 |

Primary Examiner—Charles E. Van Horn
Assistant Examiner—David A. Simmons
Attorney, Agent, or Firm—Wheeler, Morsell, House & Fuller

[57] ABSTRACT

A method of manufacture of double-faced, multiwall, and paired single-faced corrugated boards includes the step of applying a chemical gelatinization temperature depressant to the tips of the flutes of corrugated medium or substrate prior to application of a starch adhesive to the corrugated medium and before the last liner is bonded to the ocorrugated medium. The gelatinization temperature depressant enables use of lower temperatures in the hot plate section where the single-faced board plies and/or last liner are bonded to the corrugated substrate and facilitates use of a starch adhesive with a high total solids content which provides a good wet tack for subsequent handling of the board and minimizes board defects such as warping and washboarding caused by inefficient and uneven moisture redistribution or removal in the hot plate section.

9 Claims, 4 Drawing Figures

METHOD OF MAKING CORRRUGATED PAPERBOARD

BACKGROUND OF INVENTION

The invention relates to a method of applying two component adhesives to unite liners to webs of corrugated board. In the manufacture of double-faced corrugated board, a first liner is glued to one side of a corrugated substrate and a second liner is subsequently laminated to the other side of the corrugated substrate. In the manufacture of multiwall corrugated board, a liner is glued to one side of each corrugated substrate and subsequently these single-faced boards and another liner are laminated together. In the manufacture of paired single-faced boards, two corrugating mediums which have been dampened are corrugated at the same time, a liner is glued to one side of the paired mediums at the corrugating machine, a second liner is subsequently glued to the other side of the board, and the paired single-faced boards are separated during stacking.

The desired objectives in the process of assembling the single-faced board or boards and another liner are to maintain a good production rate in which the assembled board has good wet tack strength to enable immediate cutting of the board from the web and stacking of the board. Other objectives are to minimize brittle board with cracked lines, shrinkage, warp and washboarding caused by excessive heat, and to eliminate poor drying with warp and structural weakness caused by insufficient heat. Conventional apparatus and method for laminating the second liner to the substrate containing one liner and the corrugated intermediate layer is shown in FIG. 1 of the Griffith U.S. Pat. No. 3,434,901. The corrugated substrate is passed around a pre-heater drum to raise the temperature of the corrugations and travels past an adhesive applicator in which a suspension of starch is transferred to the corrugated medium. The second liner which is also trained over a pre-heater roll in contacted to the bottom of the corrugated substrate with the assembled lamina subsequently passing through a hot plate section heated by steam. The heat at the hot plate sections causes gelatinization of the starch to bond the corrugated medium to the second linear and also removes excess moisture and increases the solids content of the starch at the glue line. The conventional process requires an expensive hot plate section which may be 40 feet or more in length and requires considerable space and expense to operate. A number of the defects in the finished board are caused by the uneven heating and inefficient drying in the hot plate section, causing warping and washboarding in the finished board which causes difficulty in printing on the liner.

Various efforts have been made to improve the conventional method and to eliminate washboarding and warping of the finished board by attempting to reduce the heat required at the hot plate section by lowering the gel point of the starch in advance of the hot plate section or by modifying the methods and location of heat application. Griffith U.S. Pat. No. 3,434,901 discloses the method of gelatinizing the starch after it is applied to the substrate by a steam spray prior to application of the second liner. This Griffith patent also discloses the application of a chemical gel point depressant to the starch adhesive on the corrugated substrate prior to application of the second liner. One of the difficulties with the application of the chemical to the starch at this stage is that the early gelatinization of the exterior surface of the starch adhesive inhibits sufficient penetration of the adhesive into the second liner and thus does not provide as firm a bond as desired.

SUMMARY OF INVENTION

The present invention is concerned with the step of adhesively securing the second liner to the corrugated substrate to form either double-faced or paired single-faced boards, or single-faced plies and a last liner to form multiwall board. More particularly the invention relates to the chemical gelatinization of the adhesive (typically starch) used in the manufacture of corrugated board, thus to reduce the heat and moisture previously required in the conventional process to accomplish the gelatinization of the starch.

The method of the invention overcomes the deficiencies of the prior art methods by application of the gel point depressant to the tips of the flutes of the corrugated substrate prior to the application of the starch adhesive to the flute tips. This causes gelatinization to proceed from the tips of the flutes through the inner surface of the starch adhesive which is in contact with the gel depressant agent towards the outer exposed surface of the starch adhesive. This technique initiates gelatinization of the innermost layer of adhesive at the earliest possible moment, substantially comtemporaneously with the first contact of the adhesive with the flute tips. Yet gelatinization of the outermost layer of adhesive is delayed until after contact is made with the second liner of double-faced board, thus insuring adequate penetration of the starch adhesive into the surface of the second liner as the liner is applied and before any material gelatinization thereof has occured. These advantages also accompany the use of the invention in the production of either multiwall or paired single-faced boards.

The use of the chemical gel point depressant as disclosed herein enables use of a starch suspension with a higher total solids content than in prior art process. The method of the invention provides a thin, well-defined glue line with good wet tack strength for subsequent handling of the double-faced board after it leaves the hot plate and minimizes the amount of water needed in the starch. This technique reduces the need to evaporate water from the product, reduces the temperature requirements for the hot plate, hence minimizing the problems associated with uneven redistribution of moisture in the hot plate section and the high heat thereof such as warp, washboarding, etc.

The gel point depressant is prevented from entering the starch reservoir via the starch or glue applicator roller by controlling the thickness of the gel point depressant on the flute tips and the thickness of starch coating on the glue roller. The gel point depressant is applied in a thin film to the tips of the flutes only, and prior to the application of the starch. The film has a thickness substantially less than the coating of starch adhesive carried by the glue roll. The thicker starch layer or coating on the glue roller splits, transferring some starch to the tips of the flutes with the remaining part of the coating on the glue roller being recycled to the glue reservoir free of the depressant agent.

The chemical gelatinization process of the invention provides the desired bonding of the last liner or multiwall plies with a decrease in board rejects. The process also enables higher machine speeds and higher production because of the reduced length and temperature of the hot plate section necessary to complete the gelatinization of the starch adhesive.

Further objects, features and advantages of the present invention will become apparent from the following disclosure.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
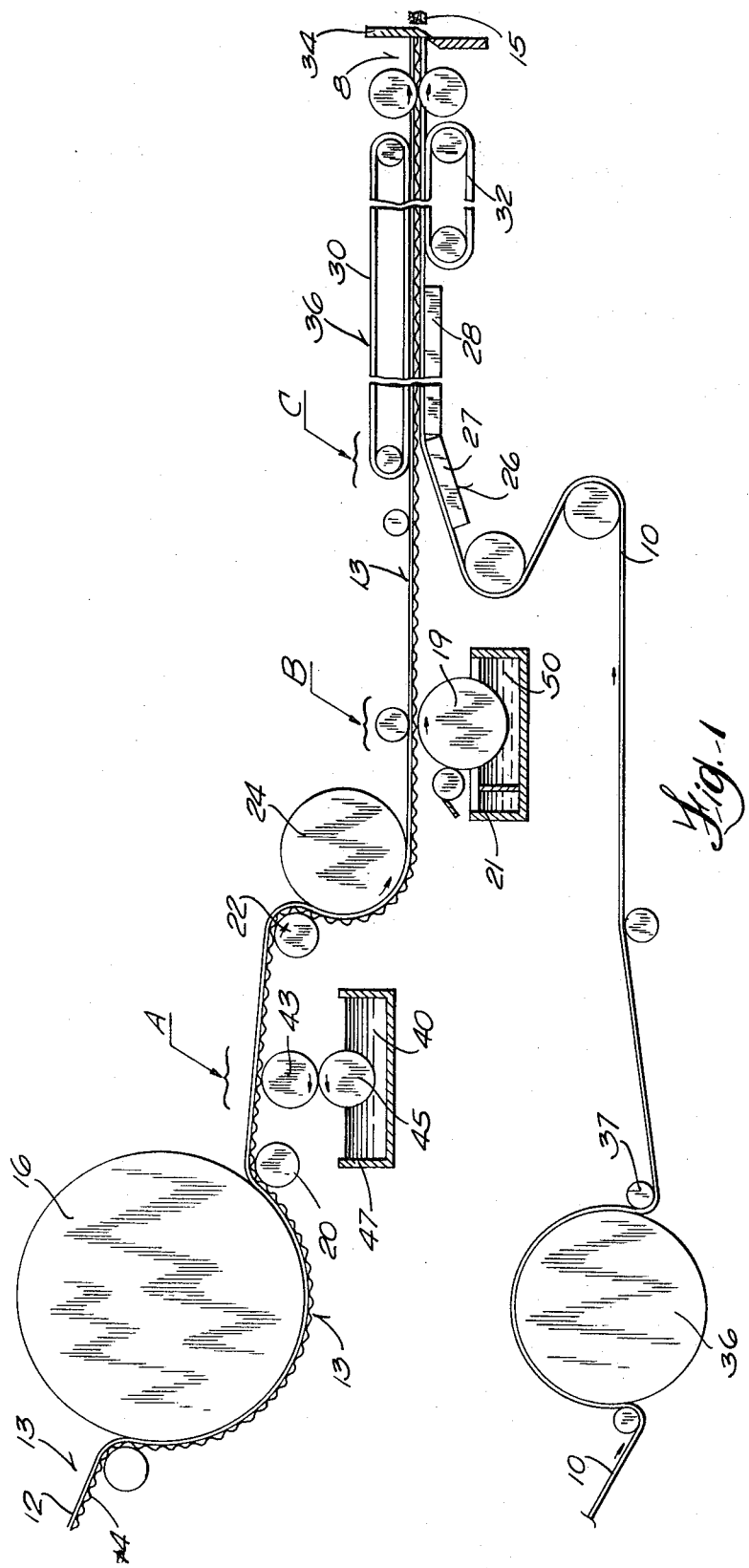
FIG. 1 is a schematic diagram of one form of apparatus employed to practice the method of the invention and illustrates the method.

The method of the invention can utilize various two component adhesives. In the disclosed embodiment starch and a gel point depressant are illustrated as such a two component adhesive. As specifically illustrated, the preferred embodiment relates to a method of constructing a double-faced or double-lined corrugated board 8 and in particular, the application of a second liner 10 to a lamina 13 which includes a corrugated medium or substrate 14 formed at the corrugation station and a first face or liner 12 laminated thereto along the flute tips 11. The apparatus shown in FIG. 1 is downstream of the corrugation station (not shown) and includes a conventional pre-heater drum 16 which raises the temperature of the web 13 prior to application of the adhesive at the glue station B. The web lamina 13 is trained around idler rollers 20 and 22, and a drum 24 and moves from the glue station B in which a glue roller 19 picks up glue from a reservoir 21 and applies it to the web 13. The web 13 then moves to a hot plate section 26 which includes a series of steam heated chests 27, 28 where the second liner 10 is bonded to the web 13. A pressure belt 30 holds the web against the second liner 10 and the steam chest 28. The steam chests 28 provide the heat to remove excess moisture and complete gelatinization of the starch as presently described. The belt 30 in cooperation with a belt 32 serve to draw the liner 10 and web 13 through the stations A, B and C. A final cut-off section 34 severs individual sheets or boards 15 from the double-faced corrugated web 8.

The second liner 10 is also trained around a preheater drum 36 and various idler rollers 37 before application to the web 13 of corrugated medium at the hot plate section 28.

As thus far described, the apparatus and sequential operation is typical of conventional double-faced corrugated board manufacture.

In accordance with the method of the invention, a gel point depressant or a gelatinizing agent 40 is applied to the tips 42 of the flutes 44 of corrugated substrate 14 at station A, prior to application of the bonding adhesive thereto at the glue station B. When a typical starch adhesive is employed at the glue station B, the gel point depressant 40 desirably comprises a solution of a caustic hydroxide such as sodium hydroxide which is inexpensive and lowers the temperature level at which gelatinization of the starch occurs. Other hydroxides can be employed. At the gelatinization temperature, the raw starch which is in the form of small granules, swells considerably, absorbs much of the available water, and is partially solubilized. The gelatinization process greatly increases the mixture's viscosity and its wet tack to hold the board 8 together until the glue line dries to give rigid non-plastic dry adhesion.

Figure 2:
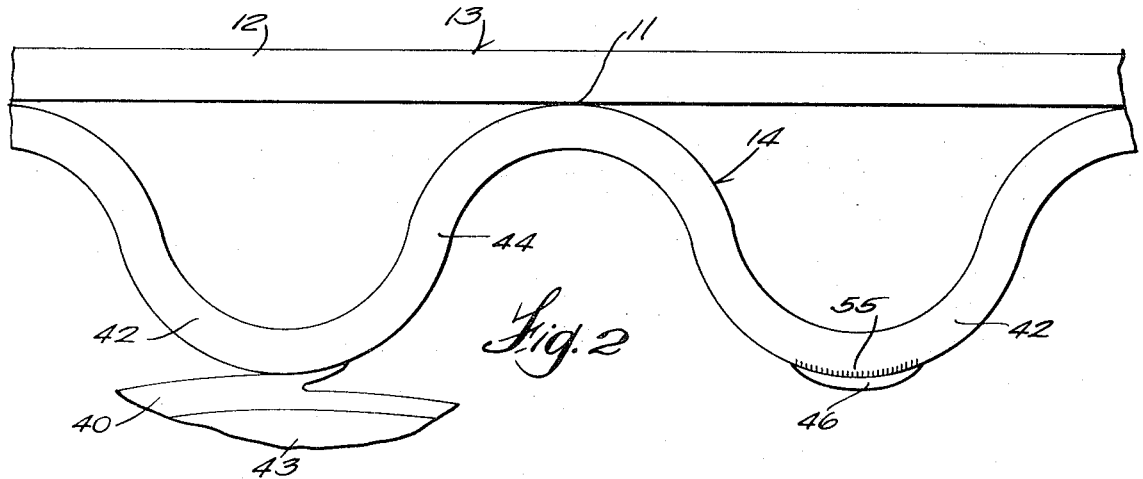
FIG. 2 is an enlarged diagrammatic view showing the application of the gel point depressant to the tips of the flutes at station A of FIG. 1.

The depressant 40 is applied only to the tips 42 of the flutes (FIGS. 1, 2) by an applicator roller 43 which is coated with a solution of sodium hydroxide by a supply roller 45 which picks up the solution from a reservoir 47. Inasmuch as the solution is applied only the tips 42 of the flutes in the form of caps 46, only a limited quantity is required as compared with the use of a spray as shown in the Griffith U.S. Pat. No. 3,434,901 which applies a coating of gel point depressant to the entire corrugated substrate, and then only after the starch adhesive is previously applied to the corrugated substrate.

Figure 3:
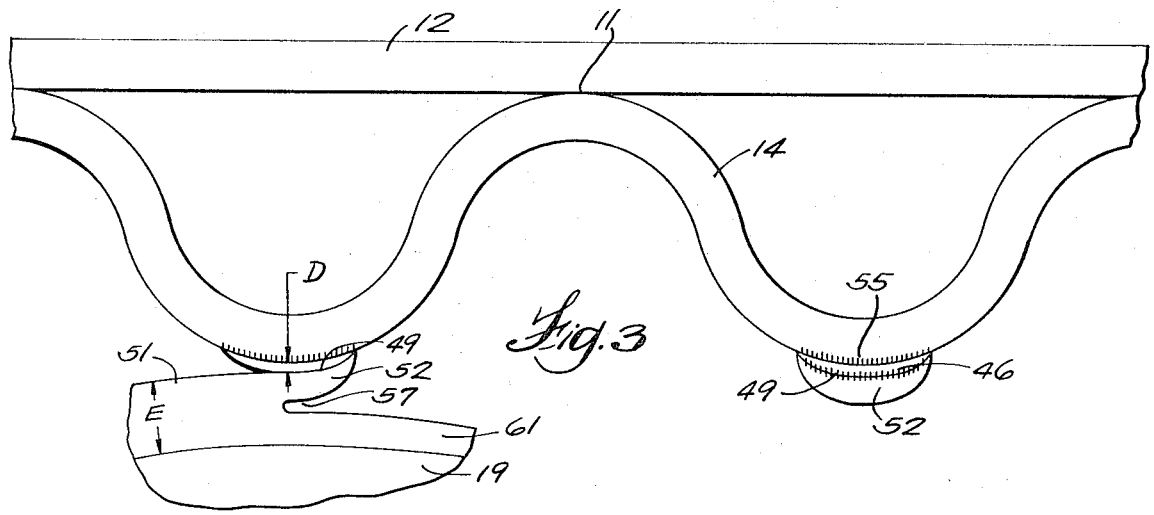
FIG. 3 is an enlarged diagrammatic view showing the application of the starch adhesive to the tips of the flutes and over the coating of gel point depressant at station B of FIG. 1.

Referring to FIG. 1, as the web 13 moves through the glue station B, the glue or adhesive 50 which is typically a starch suspension in water is applied to the tips 42 of the flutes over the gel depressant caps 46, in the form of a covering layer 52. (FIG. 3)

Entry of the gel point depressant 40 into the glue reservoir 21 is prevented by controlling the thickness D (FIG. 3) of the caps 46 of depressant and the thickness E of the glue coating 51 of the glue roller 19, thus to take advantage of a film splitting phenomenon. Film splitting results when a liquid is fed into the nip between two surfaces which separate and in which the liquid wets both surfaces. As the nip opens, a part of the liquid is carried away from the nip by each of the surfaces with the proportions of the film carried away by each surface depending on film thickness, pressure, speed of the surfaces, porosities, viscosity and ease of wetting of the surfaces.

With respect to the method of the invention, the film splitting occurs in the starch layer 51 (FIG. 3) on the glue roller 19. The thin layer or cap 46 of sodium hydroxide solution is not carried into the glue reservoir 21 because the relatively thick layer 51 of starch solution splits at 57 with the film layer 52 of starch adhering to the tips of the flutes and the film layer 61 adhering to the glue roller 19. The film splitting of the starch at the glue station is because the starch film 51 is the thicker of the two liquid layers 46, 51, the corrugated substrate 14 is more porous than the glue roller, and the viscosity of the starch at the starch-caustic interface 49 is higher than that of the layer yet to be gelatinized.

If film splitting did not occur, some of the gel point depressant would be carried into the glue pot 21 and cause progressive gelatinization of the glue supply. This would eventually prevent proper bonding of the second liner 10 to the substrate 14.

Figure 4:
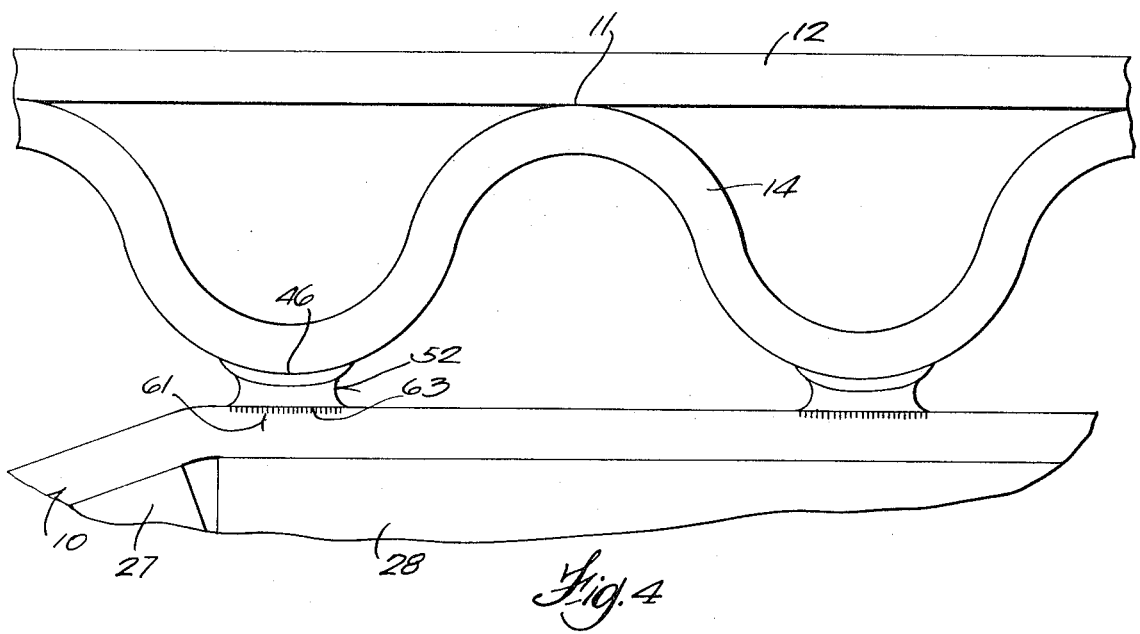
FIG. 4 is an enlarged diagrammatic view showing the application of the second liner to the flute tips at station C of FIG. 1.

A number of advantages result from the application of gel point depressant in advance of the application of the starch adhesive. Only a limited quantity of the gelatinizing agent is required because it is applied only to the tips 42 of the flutes, this being the same limited area of the corrugating medium which is subsequently coated with the starch component 50. Only a slight moisture penetration of gel depressing agent 40 occurs in the zone 55 (FIG. 2) of the tips 42, inasmuch as the 50 percent sodium hydroxide solution which is typically used does not wet the corrugated medium as easily as water. Accordingly, the quantity of moisture in the corrugated substrate 14 and which must ultimately be eliminated in the hot plate section is initially reduced. Moreover, any rosin or other acid size in the second liner 10 is protected from adverse reaction with excess gelatinizing agent by the intervening starch component layer 52 (FIG. 4). The unsized corrugated medium 14 is not adversely effected by the gel point depressant.

Inasmuch as the gelatinizing process starts at the interface 49 of the caustic and starch layers adjacent the flute tips, the application of gel point depressant to the flute tips 42 in advance of the adhesive reduces the quantity of adhesive required by limiting the penetration of the combined adhesive and gel point depressant into the porous corrugating medium 14, while permitting sufficient penetration of the less porous second liner at 61 because the outermost layer 63 of the combined adhesive and gel point depressant adjacent the second liner remains in a liquid state longer as it is the last to be gelatinized.

Starting the gelatinizing process of the starch chemically before the application of the heat of the hot plate insures that the starch granules will have enough water to fully swell to form a good band even if the adhesive's total solids are significantly higher than that typically used in prior processes. The starch gelatinization process competes for the water at the glue line with the processes of liquid migration and water evaporation from the glue line upon the application of heat in the hot plate section 26. Thus a starch adhesive can be employed with a significantly higher total solids content.

In the prior art process, without the aid of a chemical gel point depressant, the hot plate heat was the primary means of gelatinizing the starch granules and driving off excess moisture from the glue lines. Competition between these two processes limited the useful range of the adhesive's total solids from about 15 percent to about 30 percent. In the prior art process, when the adhesive's total solids were below this range, excessive heat was required to drive off the surplus moisture, thus limiting machine speed, promoting warpage, and increasing steam costs for the steam chests. When the adhesive's total solids were above this range, weak board adhesion resulted because not enough moisture was present at the glue lines to fully gelatinize the starch before the heat drove the moisture away.

The separate application of a chemical gelatinizing agent in advance of the application of the starch aids the starch granule gelatinizing process in its competition for water with the liquid migration and evaporation processes so that an adhesive with total solids greater than this range may be used without interfering with good board adhesion, and with higher machine speeds, less warpage, and lower steam costs.

With the method of the invention, a total solids content in the starch of up to 40 percent or more can be employed, and a substantially shorter hot plate section can be utilized because a gelatinized starch adhesive of this composition has enough wet track strength to retain the board components assembled during processing of the completed web into individual finished boards 15. Reduction of the length of the hot plate section is advantageous because a massive hot plate section acts as a heat sink and the temperatures cannot be rapidly changed for variations in production requirements without substantial delays.

In the fabrication of some types of corrugated board, the hot plate section can be eliminated completely because of the efficient gelatinization provided by the method of the invention. However, the draw section of the apparatus is still desirable to hold or press the assembled lamina together for a period of time sufficient to obtain a good wet bond.

The good immediate wet tack of the second liner 10 to the corrugated substrate 14 enables use of maximum machine speeds of 650 feet per minute or more with lower hot plate section steam pressure and steam chest surface temperatures.

The corrugated board produced by the method of the invention provides an attractive board free of defects with better surface for printing than board produced by prior art methods. In addition, it has a strong bond and higher tensile strength with a thin, well-defined glue line. Also, the finished boards are flat and do not have to be cross-stacked to obtain a pallet load of uniform height along the stack margins, thus automatic stacking can be employed as compared with manual stacking used in prior art processes.

Although the method of the invention has been specifically described for the construction of double-faced board, the method can also advantageously be employed to unite two single-faced boards and a third liner to form a multiwall corrugated board, to unite a liner to a web composed of two corrugated mediums and a liner to form paired single-faced boards. For example, the board layer 10 can comprise a corrugated medium with a single liner face, with the liner face being applied to the tips 42 of the flutes and at the hot plate section with a third liner also applied at the same point in the sequence.

What is claimed is:

1. In a method of manufacture of double-faced corrugated paperboard, the improvement comprising the steps of applying a coating of gel point depressant to the exposed flute tips of the corrugated medium faced with a single liner opposite the exposed flute tips by contact of an applicator carrying the depressant with the flute tips, applying an adhesive over the coated flute tips with an adhesive roller and wherein the coating of adhesive on said roller is substantially thicker than the coating of gel point depressant on the flute tips to cause a splitting of the adhesive coating on the roller into an adhesive layer on the flute tips and an adhesive layer on the adhesive roller which isolates the depressant coating from the adhesive roller and the coating of adhesive film on the adhesive roller, initiating gelatinization of the adhesive starting from the interface of the adhesive and gel point depressant outwardly through the adhesive coating, and applying an additional board layer to the coated flute tips prior to material gelatinization of the outer exposed surface of the adhesive.

2. The method of claim 1 wherein said roller is operatively associated with an adhesive reservoir and wherein the coating of adhesive on said roller is substantially thicker than the coating of gel point depressant of the flute tips to cause a splitting of the adhesive coating on the roller into an adhesive layer on the flute tips and an adhesive layer on the adhesive roller which isolates the depressant coating from the adhesive roller and the coating of adhesive film on the adhesive roller which adhesive coating is recycled back to the reservoir free of depressant.

3. The method of claim 1 wherein the additional board layer is a second liner.

4. The method of claim 1 wherein the additional board layer is a corrugated board with a single liner and a third liner.

5. A method in accordance with claim 1 wherein said gel point depressant comprises caustic hydroxide.

6. A method in accordance with claim 1 wherein the adhesive comprises a starch suspension with a total solids content in excess of 40 percent.

7. In the method of making corrugated paperboard with a double liner, including the step of corrugating a continuous web of corrugated medium to provide a series of flutes therein and applying a first liner to the corrugated medium, the improvement comprising the steps of applying a coating of gel point depressant to the exposed flute tips of the corrugated medium faced with a single liner opposite the exposed flute tips by contact of an applicator carrying the depressant with the flute tips, applying an adhesive over the coated flute tips with an adhesive roller and wherein the coating of adhesive on said roller in substantially thicker than the coating of gel point depressant on the flute tips to cause a splitting of the adhesive coating on the roller into an adhesive layer on the flute tips and an adhesive layer on the adhesive roller which isolates the depressant coating from the adhesive roller and the coating of adhesive film on the adhesive roller, initiating gelatinization of the adhesive starting from the interface of the adhesive and gel point depressant outwardly through the adhesive coating, and applying an additional board layer to the coated flute tips prior to material gelatinization of the outer exposed surface of the adhesive.

8. The method of claim 3 including the step of applying heat to the combined web after the second liner is applied to the corrugated medium.

9. The method of claim 8 including the step of applying pressure to the web after the second liner is applied to the corrugated medium.

* * * * *

UNITED STATES PATENT AND TRADEMARK OFFICE
CERTIFICATE OF CORRECTION

PATENT NO. : 3,864,185
DATED : February 4, 1975
INVENTOR(S) : Paul A. Johnson et al.

It is certified that error appears in the above-identified patent and that said Letters Patent are hereby corrected as shown below:

Item 45, "Feb. 4, 1974 should read ---Feb. 4, 1975---

Item 54, "Corrrugated" should read ---Corrugated---

Column 7, Line 1, "of" should read ---on---

Signed and Sealed this seventh Day of October 1975

[SEAL]

Attest:

RUTH C. MASON
*Attesting Officer*

C. MARSHALL DANN
*Commissioner of Patents and Trademarks*